United States Patent
Hemmi et al.

(10) Patent No.: US 7,538,464 B2
(45) Date of Patent: May 26, 2009

(54) SEAL FOR GENERATOR

(75) Inventors: Makoto Hemmi, Hitachinaka (JP);
Takashi Watanabe, Hitachi (JP);
Takahiko Sano, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 127 days.

(21) Appl. No.: 11/526,605

(22) Filed: Sep. 26, 2006

(65) Prior Publication Data
US 2007/0069596 A1   Mar. 29, 2007

(30) Foreign Application Priority Data
Sep. 28, 2005   (JP) ............................... 2005-281068

(51) Int. Cl.
*H02K 5/16* (2006.01)
*H02K 7/08* (2006.01)
(52) U.S. Cl. ............................ 310/90; 277/346; 310/55
(58) Field of Classification Search .................. 310/90, 310/55
See application file for complete search history.

(56) References Cited

U.S. PATENT DOCUMENTS

| | | | | |
|---|---|---|---|---|
| 3,172,671 A | * | 3/1965 | Downs et al. ................ 277/543 |
| 4,323,801 A | * | 4/1982 | Weghaupt et al. .............. 310/52 |
| 5,134,378 A | * | 7/1992 | Twerdochlib ................ 324/545 |
| 5,361,483 A | * | 11/1994 | Rainville et al. ............ 29/524.1 |
| 5,915,147 A | * | 6/1999 | Kouno et al. ................... 399/69 |
| 6,086,805 A | * | 7/2000 | Abe ............................ 264/138 |
| 6,378,873 B1 | * | 4/2002 | Mayer et al. ................. 277/355 |
| 6,431,550 B1 | * | 8/2002 | Tong ........................... 277/346 |
| 6,464,230 B1 | * | 10/2002 | Tong et al. ................... 277/355 |
| 2001/0048253 A1 | * | 12/2001 | Nakamura et al. ............ 310/59 |
| 2004/0251634 A1 | * | 12/2004 | Shimazu et al. ............. 277/434 |
| 2005/0206249 A1 | * | 9/2005 | Hashiba et al. ................ 310/54 |

FOREIGN PATENT DOCUMENTS

JP   05-146118   6/1993

* cited by examiner

*Primary Examiner*—Quyen P Leung
*Assistant Examiner*—Alex W Mok
(74) *Attorney, Agent, or Firm*—Antonelli, Terry, Stout & Kraus, LLP.

(57) ABSTRACT

The seal devices on both ends of the rotary shaft are supported by the casing, the bearing on one end of the rotary shaft is supported by a bearing pedestal which is separated of the casing, the bearing on the other end of the rotary shaft is supported by the casing, the seal ring of the seal device on one end of the rotary shaft is divided into circumferential segments, and the seal ring of the seal device on the other end of the shaft is a unified seal ring.

18 Claims, 5 Drawing Sheets

SEAL FOR GENERATOR

CLAIM OF PRIORITY

The present application claims priority from Japanese application serial no. 2005-281068, filed on Sep. 28, 2005, the content of which is hereby incorporated by reference into this application.

BACKGROUND OF THE INVENTION

1. Field of the invention

This invention relates to a seal device for generator that are cooled by hydrogen gas.

2. Description of the Prior Art

A large-scale turbine generator hermetically contains hydrogen gas that has the highest heat transfer coefficient among gases to cool the inside of the generator. One of devices to seal hydrogen gas in the generator is disclosed for example by a shaft seal device of Japanese Patent Laid-open No. Hei 5(1993)-146118. This shaft seal device contains two seal rings. One of the seal rings faces hydrogen gas inside the generator and the high-pressure oil supply side. The other seal ring faces the high-pressure oil supply side and the outside of the generator.

SUMMARY OF THE INVENTION

The above Japanese Patent Laid-open No. Hei 5(1993)-146118 describes a longitudinal uneven contact of the seal but does not describe the follow-up of the seal ring when the rotary shaft rotates very eccentrically.

An object of this invention is to provide a seal device for a generator that increases the pressure of oil that is supplied to a clearance between the surface of the rotary shaft and the surface of the seal ring.

The above object can be accomplished by a seal for a power generator comprising a rotor in a casing that hermetically contains hydrogen gas, a rotary shaft to rotate and support the rotor in the casing, a seal ring mounted on a seal device to seal a clearance between the casing and each end of the shaft, and a bearing provided near the seal ring to support the rotary shaft, wherein the seal device is supported by the casing, the bearing on one end of the rotary shaft is supported by a bearing pedestal which is independent of the casing, the bearing on the other end of the rotary shaft is supported by the casing, the seal ring of the seal device on one end of the rotary shaft is divided into circumferential segments, and the seal ring of the seal device on the other end of the shaft is a unified seal ring.

The above object can also be accomplished by making the area where the divided seal ring segments are in contact with the rotary shaft wider than the area where the unified seal ring is in contact with the rotary shaft.

The above object can also be accomplished by making the areas where the seal rings are in contact with the rotary shaft longer in the axial direction of the rotary shaft.

The above object can also be accomplished by providing a low rigidity material layer on the seal casing or seal ring where the casing is in contact with the seal ring.

The above object can also be accomplished by making the low rigidity material layer of a PEEK resin.

This invention can provide a generator seal device that is equipped with seal rings capable of following up the eccentricity of the rotary shaft.

DESCRIPTION OF THE PREFERRED EMBODIMENTS

A general seal device for a hydrogen-cooled power generator will be explained in reference to FIG. 1 and FIG. 2.

Figure 1:
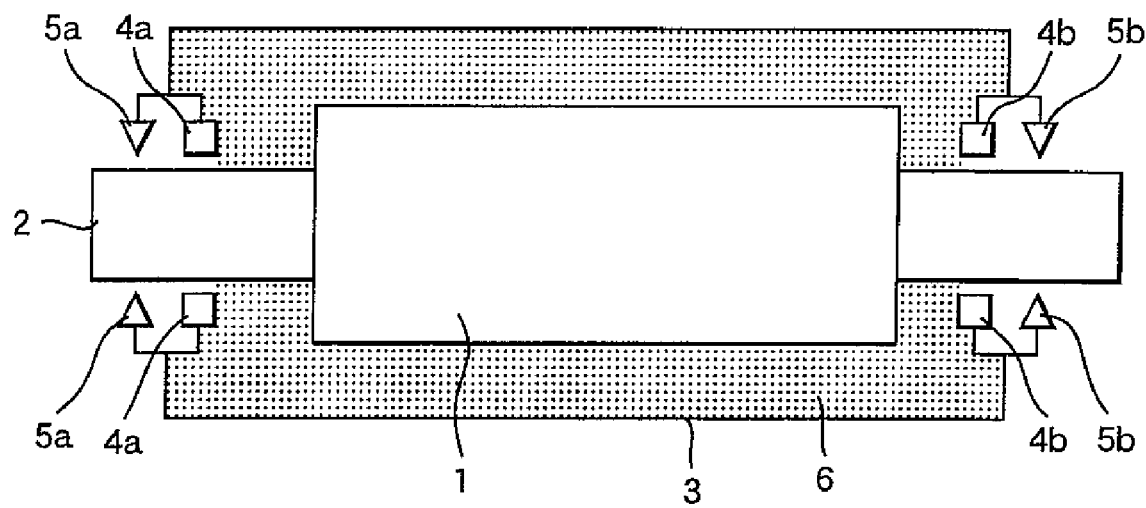
FIG. 1 is a schematic diagram of a general hydrogen-cooled generator.

FIG. 1 is a schematic diagram showing the arrangement of a general seal device.

Figure 2:
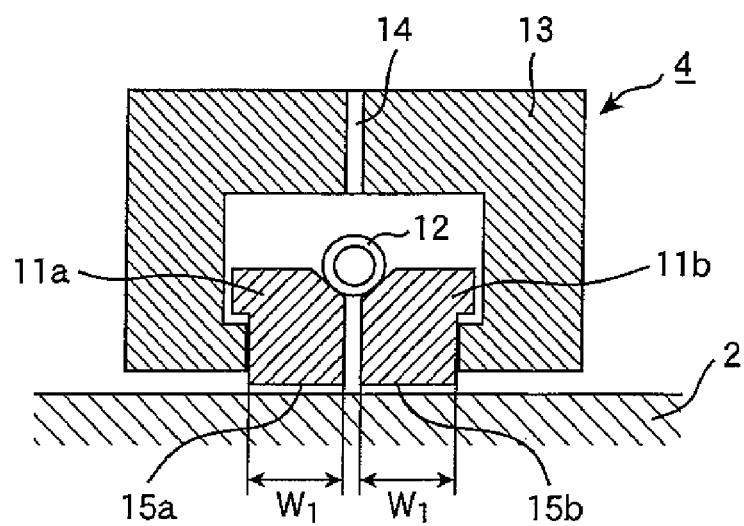
FIG. 2 is a magnified sectional diagram of a seal device mounted on a general hydrogen-cooled generator.

FIG. 2 is a sectional diagram of a general seal device.

Figure 3:
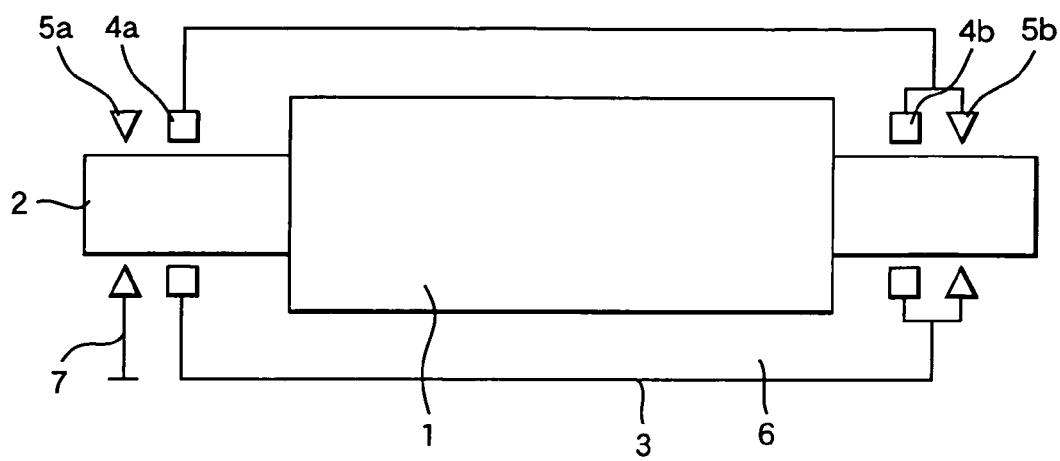
FIG. 3 is a schematic diagram of a general hydrogen-cooled generator equipped with the other configuration.

FIG. 3 is a schematic diagram showing the arrangement of the other general seal device.

In FIG. 1, generator rotor 1 is mounted on rotary shaft 2 and housed in generator casing 3. The inside of generator casing 3 is filled with hydrogen gas 6 to cool generator rotor 1 and others. Hydrogen gas 6 circulates through generator casing 3 and a heat exchange that is not shown in the figure and is thermally controlled to keep the temperature inside the generator casing 3 under a preset temperature. Seal devices 4a and 4b are provided between generator casing 3 and rotary shaft 2 to prevent leak of hydrogen gas 6 from generator casing 3. Two seal devices 4a and 4b are provided to seal both rotary shafts 2 at both ends of rotor 1.

The inner diameters of seal devices 4a and 4b are greater than the outer diameter of rotary shaft 2 to provide a preset clearance between the surface of rotary shaft 2 and the inner wall surface of each of seal devices 4a and 4b. Bearings 5a and 5b are mounted on generator casing 3 together with seal devices 4a and 4b.

Referring to FIG. 2, seal device 4 (4a and 4b) is equipped with a pair of circular seal rings 11a and 11b which have greater inner diameters than the outer diameter of rotary shaft 2 and are spaced along the rotary shaft at a preset interval, oil supply means 14 for supplying high-pressure seal oil to these pair of seal rings 11a and 11b, seal casing 13 that houses these pair of seal rings 11a and 11b and the seal oil, and spring 12 provided in contact with the outer peripheries of seal rings 11a and 11b.

The seal oil supplied from oil supply means 14 to the pair of seal rings 11a and 11b goes out of the generator or into the generator through clearance 15a or 15b between rotary shaft 2 and seal rings 11a and 11b. As the seal oil completely fills up clearances 15a and 15b, hydrogen gas cannot leak from inside the generator to the outside.

Referring to FIG. 3, the general hydrogen-cooled power generator of FIG. 3 is the same as that of FIG. 1, but bearing 5a of FIG. 3 is supported by bearing pedestal 7 which is separated from seal casing 13. That is, the bearing pedestal 7 is independent of the casing 3.

When bearing 5a is supported by bearing pedestal 7 whose material is different from that of casing 3 that supports seal device 4a in this way, the center of rotary shaft 2 is apt to move greatly to the shaft center of seal device 4a while the generator is running. This is because the heat capacity of bearing pedestal 7 is smaller than that of casing 3 that supports seal device 4a and bearing pedestal 7 extends more by heat.

When bearing pedestal 7 expands by heat, rotary shaft 2 is lifted up vertically together with bearing 5a with bearing 5b (upper right side of FIG. 3) as the axis. Contrarily, generator casing 3 that supports seal device 4a expands less by heat and seal device 4a moves less in the vertical upward direction. Therefore, the axis of rotary shaft 2 is shifted up vertically relative to seal device 4a.

If the quantity of eccentricity of rotary shaft 2 is greater than clearance 15a and 15b between rotary shaft 2 and seal rings 11a and 11b, rotary shaft 2 is apt to move up and touch seal rings 11a and 11b when their follow-up property is not appropriate. In extreme cases, the touch area may be broken. Even if the touch part is not broken, small flaws on the touch part may cause vibrations due to deformation by heat.

By the way, hydrogen gas has the property of dissolving into the seal oil. So, a leakage of the seal oil to the outside of the generator means a loss of hydrogen gas. Therefore, hydrogen gas must be replenished. This increases the power generation cost. If hydrogen gas is not replenished, the hydrogen gas pressure drops and the cooling effect goes down. Consequently the rotary shaft deforms by frictional heat on the contact area and this deformation increases rotational vibration of the shaft.

As explained above, when the bearing is supported by a member whose material is different from that of the casing, it is found that the shaft vibration is great. To solve this problem, the present inventors, invented seal rings that can reduce vibrations due to contacts of solid materials by following up the rotation (vibration) of the rotary shaft.

Embodiment 1

One embodiment of this invention will be explained below with reference to FIG. 4 and FIG. 5.

Figure 4:
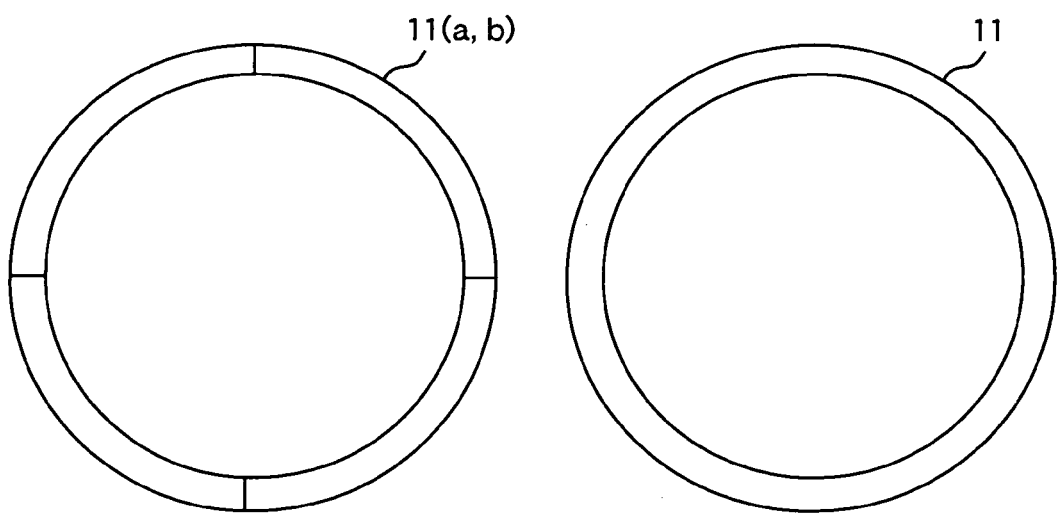
FIG. 4 is a front view of a seal ring which is an embodiment of this invention.

FIG. 4 is a front view of a seal ring which is an embodiment of this invention.

Figure 5:
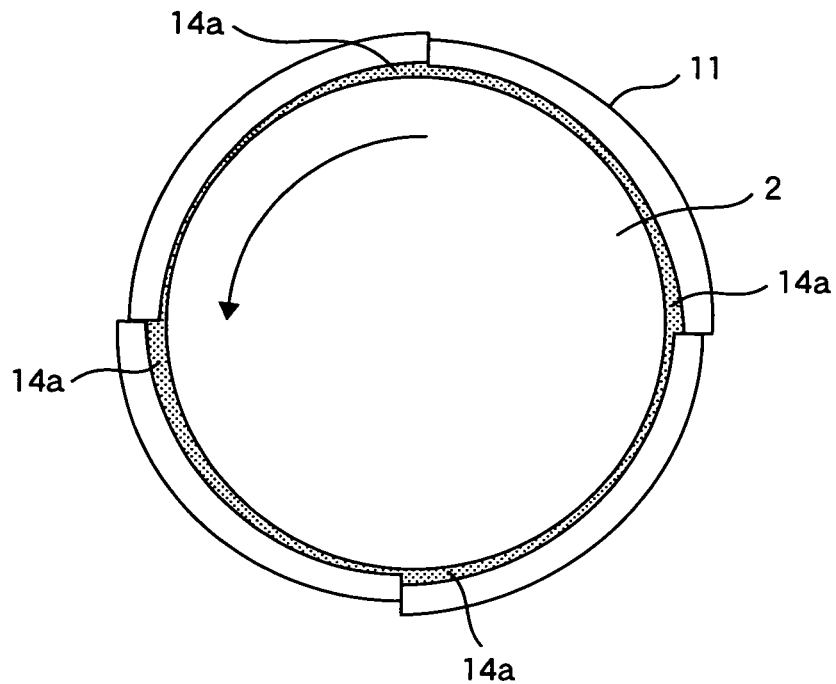
FIG. 5 is a front view of a seal ring to explain the effect of this invention.

FIG. 5 is a front view of a seal ring which forms an oil film.

As shown in FIG. 3, it is found that rotary shaft 2 is shifted with bearing 5b (in the right side of FIG. 3) as the axis in the case that bearing 5a in the left side of FIG. 3 is supported by bearing pedestal 7 which is separated from casing 3. To solve this problem, seal rings 11a and 11b of seal device 4 (4a) are circumferentially divided as shown in the left side of FIG. 4. Seal ring 11 in the right side of FIG. 4 is a conventional seal ring that is not divided circumferentially.

FIG. 5 shows how oil films are formed by seal ring 11 (a and b). Oil film 14a is formed in clearances between the outer periphery of rotary shaft 2 and the inner surface of divided seal ring 11 (a and b). As seal ring 11 (a and b) of this embodiment is divided, seal ring 11 can move flexibly according to the degree of eccentricity of rotary shaft 2 and the thickness of oil layer 14a also varies.

A power generator is driven by a gas turbine or steam turbine as shown in FIG. 3. Bearing 5a in the driving side to which the turbine is connected is provided on independent bearing pedestal 7 which is away from generator casing 3 because the bearing 5a serves as the bearing of the turbine end. Also in this case, seal device 4a is provided in generator casing 3. In such a structure, bearing 5a and bearing pedestal 7 that supports seal device 4a extend differently by heat while the generator is in service. As rotary shaft 2 is moved up vertically by expansion of bearing pedestal 7, rotary shaft 2 in seal device 4a is shifted much relatively.

In the other end of rotary shaft 2, the relative eccentricity of the rotary shaft in the seal section is suppressed since bearing 5b and seal device 4b are supported by generator casing 3 of the same member.

In accordance with this embodiment, the seal ring is circumferentially divided in the seal section where bearing 5a is supported by bearing pedestal 7. This increases the rigidity of oil film between the seal ring and the rotary shaft and consequently can reduce the vibration of the rotary shaft.

This will be explained in detail referring to FIG. 5 and FIG. 6.

As shown in FIG. 5, a hydrodynamic pressure generates in the clearance between rotary shaft 2 and seal ring 11 while rotary shaft 2 rotates. Consequently, the divided seal rings are a little shifted from each other. This increases a wedge effect and facilitates generation of the hydrodynamic pressure in the oil film. As the result, the rigidity of the oil film increases.

Figure 6:
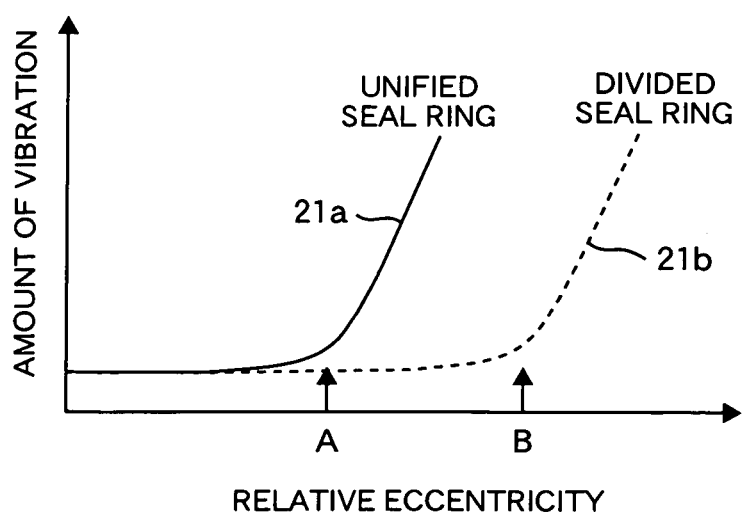
FIG. 6 shows a relationship between relative eccentricity and vibration amplitude of a rotary shaft in a seal device.

As shown in FIG. 6, when the relative amount of eccentricity exceeds the critical amount, seal ring 11 touches rotary shaft 2 and this causes vibrations of greater amplitudes. For example, the unified seal ring shows curve 21a as the relationship of relative amount of eccentricity versus amount of vibration. The critical value is A. Contrarily, the divided seal ring shows curve 21b as the relationship of relative amount of eccentricity versus amount of vibration. The critical value is B which is greater than A. In other words, the divided type of seal ring has a greater critical value that increases vibration and consequently suppresses vibration.

Figure 7:
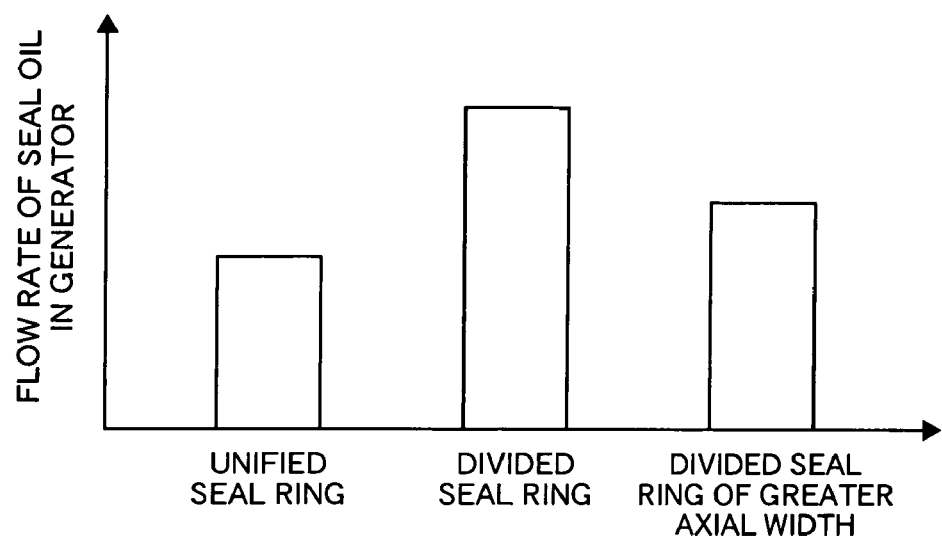
FIG. 7 is a graph representing how the flow rate of seal oil changes by seal ring types.

In accordance with this embodiment, the seal ring is unified in the seal section where the bearing and the seal section are supported by an identical member. As shown in FIG. 7, when the unified seal ring is compared by the divided seal ring, the unified seal ring can use less seal oil. Here, the "unified" seal rings contain unified seal rings that are made by bonding or fastening divided seal ring segments besides seal rings made of a single member.

Embodiment 2

Embodiment 2 of this invention will be explained referring to FIG. 8.

Figure 8:
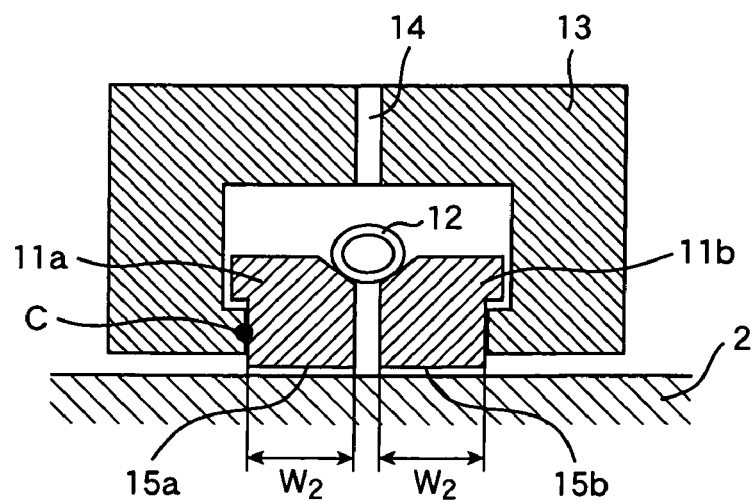
FIG. 8 is a sectional view of a seal device to explain another embodiment.

In FIG. 8, Embodiment 1 circumferentially divides a seal ring in the seal section where bearing 5 is supported by a bearing pedestal to lessen contact between the rotary shaft and the seal ring and consequently prevent the shaft vibration from increasing. However, divided seal ring 11 possibly requires more seal oil than the unified seal ring that is shown in the right side of FIG. 7. Consequently, the divided seal ring will consume more hydrogen gas.

As shown in FIG. 8, Embodiment 2 makes axial width W2 of the seal ring in the seal section where bearing 5 is supported by bearing pedestal 7 wider than the axial width W1 of a seal ring in the seal section which is supported by the same member as the bearing.

As shown in FIG. 7, it is possible to reduce the flow rate of seal oil by widening the seal ring along the rotary shaft. This is because the greater axial width of the seal ring increases the resistance of the flow path of the seal oil and consequently suppresses an increase in the quantity of leak-out of seal oil.

Embodiment 3

Figure 9:
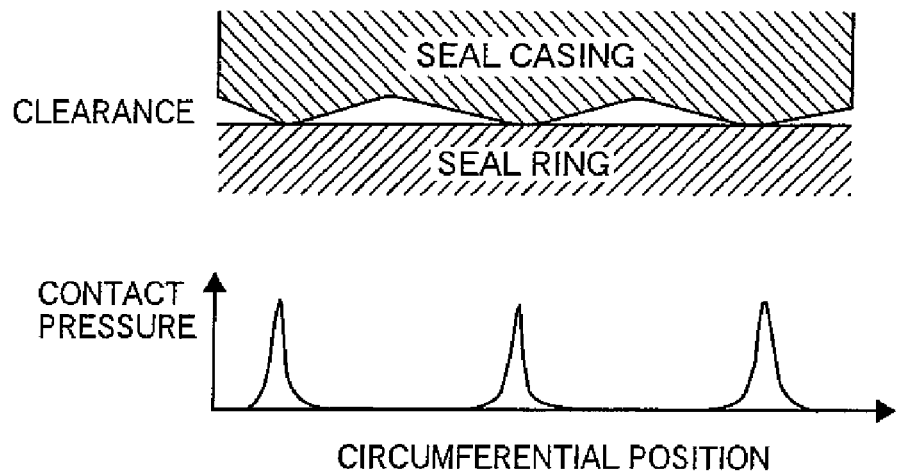
FIG. 9 shows a clearance between the conventional seal casing and the contact area of a seal ring and a contact status of the contact pressure structure.

Embodiment 3 of this invention will be explained referring to FIG. 9 and FIG. 10. These figures show the contact status of the seal ring with the seal casing on a circle concentric to the rotary shaft which passes through point C of FIG. 8. FIG. 9 shows the contact status of the conventional seal ring type and FIG. 10 shows the contact status of the seal ring type in accordance with this invention.

The description below assumes that Embodiment 3 provides a low-rigidity material layer on the surface of the seal casing where the seal casing is in contact with the seal ring. The material of the low-rigidity material layer is, for example, a PEEK resin or other heat-resistant resin. The rigidity of this material is at most some GPa although it depends upon the recipe of the reinforcing compounds. Further, the thickness of this layer is some millimeters.

While the generator is in service, the sliding areas of the seal ring and the rotary shaft generate heat by friction. This heat and stresses by the pressure of hydrogen gas in the seal casing cause the seal casing to circumferentially deform in a corrugating manner. Consequently, the contact areas of the seal casing and the seal ring become uneven. In this status, the seal casing touches the seal ring in some areas but departs from the seal ring in other areas to make wide-open clearances. Seal oil is apt to leak out through such wide-open clearances. This contributes to the increase of the flow rate of seal oil and consequently to the increase of the loss of hydrogen gas.

Figure 10:
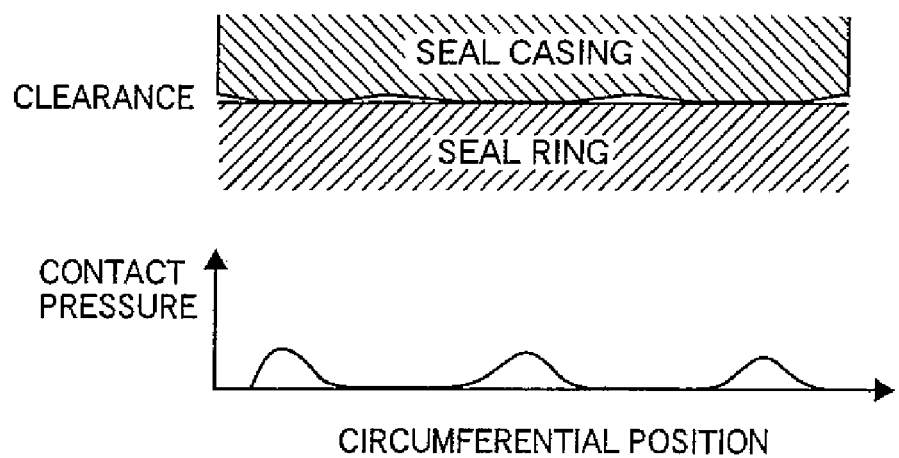
FIG. 10 shows a clearance between the seal casing of this invention and the contact area of a seal ring and a contact status of the contact pressure structure.

When a low-rigidity material layer is provided on the seal casing, the contact areas are compressed and consequently the clearances can be narrowed as shown in FIG. 10. This can reduce the leak-out of seal oil and consequently reduce the loss of hydrogen gas.

As a resin material is less heat conductive than iron material, the resin material, when used for the low-rigidity material layer, can suppress heat generated in the area at which the seal ring is in contact with the rotary shaft from transferring to the seal casing and consequently, thermal deformation of the seal casing can be suppressed. Additionally, resin materials are more lubricative than iron materials (or have lower coefficients of friction) and have an effect to move point B further to the right in FIG. 6.

As explained above, this invention circumferentially divides seal rings in the seal section which is supported by a member different from the bearing. This can suppress contact between seal rings and consequently vibrations due to contacts. This reduces the contact between the seal rings and the rotary shaft and consequently reduces vibrations due to contact. Further, the seal ring is not divided in the seal section which is supported by the same member as the bearing. Therefore, the quantity of seal oil can be reduced. In this way, the seal device of this invention can prevent vibrations and reduce the loss of seal oil.

What is claimed is:

1. A seal for a power generator comprising a rotor in a casing that hermetically contains hydrogen gas, a rotary shaft to rotate and support the rotor in the casing, a seal ring mounted on a seal device to seal a clearance between the casing and each end of the shaft, and a bearing provided near the seal ring to support the rotary shaft, wherein
the seal device is supported by the casing,
the bearing on one end of the rotary shaft is supported by a bearing pedestal which is independent of the casing,
the bearing on the other end of the rotary shaft is supported by the casing,
the seal ring of the seal device on one end of the rotary shaft is divided into circumferential segments, and
the seal ring of the seal device on the other end of the shaft is a unified seal ring that is not divided circumferentially.

2. The seal for a power generator according to claim 1, wherein the area where the divided seal ring segments are in contact with the rotary shaft is wider than the area where the unified seal ring is in contact with the rotary shaft.

3. The seal for a power generator according to claim 2, wherein the areas where the seal rings are in contact with the rotary shaft are made longer in the axial direction of the rotary shaft.

4. The seal for a power generator according to claim 1, wherein a low rigidity material layer is provided on the seal casing or on the seal ring where the casing is in contact with the seal ring.

5. The seal for a power generator according to claim 4, wherein the low rigidity material layer is made of a PEEK resin.

6. The seal for a power generator according to claim 1, wherein the unified seal ring is made by bonding or fastening divided seal ring segments.

7. The seal for a power generator according to claim 1, wherein the unified seal ring is made of a single member.

8. A seal for a power generator comprising a rotor in a casing that hermetically contains hydrogen gas, a rotary shaft to rotate and support the rotor in the casing, a seal ring mounted on a seal device to seal a clearance between the casing and each end of the shaft, and a bearing provided near the seal ring to support the rotary shaft, wherein
the seal device is supported by the casing,
the bearing on one end of the rotary shaft is supported by a bearing pedestal of a material different from the material of the casing,
the bearing on the other end of the rotary shaft is supported by the casing,
the seal ring of the seal device on one end of the rotary shaft is divided into circumferential segments, and
the seal ring of the seal device on the other end of the shaft is a unified seal ring that is not divided circumferentially.

9. The seal for a power generator according to claim 6, wherein the area where the divided seal ring segments are in contact with the rotary shaft is wider than the area where the unified seal ring is in contact with the rotary shaft.

10. The seal for a power generator according to claim 9, wherein the areas where the seal rings are in contact with the rotary shaft are made longer in the axial direction of the rotary shaft.

11. The seal for a power generator according to claim 6, wherein a low rigidity material layer is provided on the seal casing or on the seal ring where the casing is in contact with the seal ring.

12. The seal for a power generator according to claim 11, wherein the low rigidity material layer is made of a PEEK resin.

13. The seal for a power generator according to claim 6, wherein the unified seal ring is made by bonding or fastening divided seal ring segments.

14. The seal for a power generator according to claim 6, wherein the unified seal ring is made of a single member.

15. A power generator comprising a rotor in a casing that hermetically contains hydrogen gas, a rotary shaft to rotate and support the rotor in the casing, a seal ring mounted on a seal device to seal a clearance between the casing and each end of the shaft, and a bearing provided near the seal ring to support the rotary shaft, wherein the seal device is supported by the casing, the bearing on one end of the rotary shaft is supported by a bearing pedestal which is independent of the casing, the bearing on the other end of the rotary shaft is supported by the casing, the seal ring of the seal device on one end of the rotary shaft is divided into circumferential segments, and the seal ring of the seal device on the other end of the shaft is a unified seal ring that is not divided circumferentially.

16. The power generator according to claim 15, wherein the bearing pedestal is made of a material different from the material of the casing

17. The power generator according to claim 15, wherein the unified seal ring is made by bonding or fastening divided seal ring segments.

18. The power generator according to claim 15, wherein the unified seal ring is made of a single member.

\* \* \* \* \*